April 6, 1954
G. A. LYON
2,674,495
WHEEL COVER STRUCTURE
Filed Feb. 15, 1949
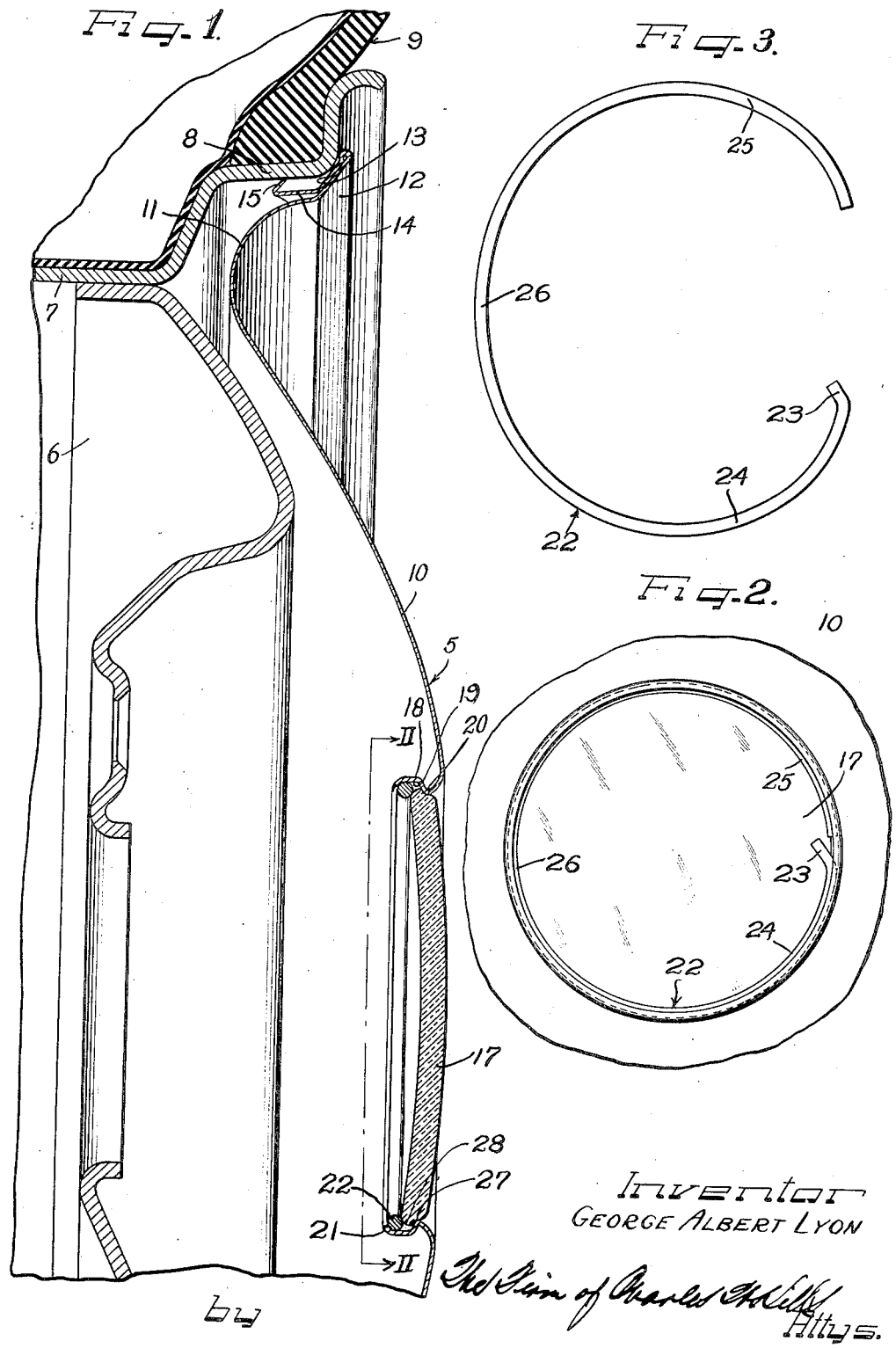
Inventor
GEORGE ALBERT LYON
by
Attys.

Patented Apr. 6, 1954

2,674,495

UNITED STATES PATENT OFFICE 2,674,495

WHEEL COVER STRUCTURE

George Albert Lyon, Detroit, Mich.

Application February 15, 1949, Serial No. 76,476

3 Claims. (Cl. 301—37)

The present invention relates to improvements in the protection and ornamentation of the outer sides of vehicle wheels, and more particularly relates to improved cover structure for disposition at the outer side of a vehicle wheel.

An important object of the present invention is to provide an improved wheel cover structure having improved central medallion means.

Another object of the invention is to provide improved means for securing a circular member within an opening of a carrying member.

Another object of the invention is to provide improved means for removably securing a central ornamental or medallion element in a wheel cover.

Yet another object of the invention is to provide improved split ring retaining means for securing a central ornamental or medallion member in a wheel cover.

According to the general features of the invention there is provided in a wheel cover structure, a cover member having a circular opening defined by an axially inwardly extending annular flange shaped to provide a radially inwardly opening annular groove, a circular member having its periphery in said groove, a resilient radially expansible retaining member sprung into said groove behind the margin of said circular member and retaining the circular member in assembly within said groove, and means on said cover member for retaining engagement with a vehicle wheel.

According to other general features of the invention a sheet metal member having a circular opening therein defined by a flange extending from the plane of the member, said flange having a grooved cross-section with the groove opening radially inwardly and defined adjacent juncture of the flange with the body of the member by a radially inwardly projecting shoulder and at the extremity of the flange by a generally radially inturned extremity flange portion offset radially outwardly with respect to said shoulder, a disk closing said opening and engaged behind said shoulder, the diameter of the disk being greater than the radially inward projection of the shoulder but smaller than the diameter on which the edge of the terminal flange portion lies whereby to clear the latter in mounting the disk in the groove, the margin of said disk being thinner than the width of the groove, and a retaining member seating in said groove behind the margin of the disk and held in place by said extremity flange portion and being of a size to retain the disk margin within the groove.

According to the other objects of the invention there is provided an expansible split retaining ring for securing a disk in closing relation in an opening in a wheel cover having an annular grooved flange defining the opening, the ring having the opposing end sections thereof preformed to the radius of said groove and the portion thereof intermediate said sections preformed to a larger radius and flexible to the radius of the groove concentric with said end sections upon drawing said end sections toward one another.

Other objects, features and advantages of the invention will be readily apparent from the following detailed description of a preferred embodiment thereof taken in conjunction with the accompanying drawings in which:

Figure 1 is a diametrical sectional view through a vehicle wheel and cover therefor embodying the features of the present invention;

Figure 2 is a fragmentary rear elevational view of the wheel cover taken substantially on the line II—II of Figure 1; and Figure 3 is an elevational view of the expansible split retaining ring by which the central closure disk is retained on the cover.

As shown on the drawings:

The present invention is embodied in a wheel cover 5 which is constructed and arranged to be mounted in protective, ornamental relation at the outer side of a vehicle wheel including a wheel body 6 and a tire rim 7, the tire rim being of the multi-flange drop center type including an intermediate generally axially extending flange 8 and being configurated to receive a pneumatic tire and tube assembly 9.

Although the wheel cover 5 may take a variety of different shapes and may be of different sizes, it is herein shown as of the full disk type in which a generally convex large crown portion 10 has an annular margin including an axially inwardly directed large radius concave cross-section juncture rib portion 11 and a generally frusto-conically tapered marginal extremity portion 12. Means for securing the cover on the wheel comprises an underturned marginal flange 13 having retaining finger structure 14 behind the wheel and intermediate the juncture rib portion 11 and the tire rim intermediate flange 18 with which generally radially and axially outwardly extending terminal retaining flange portions 15 engage in wedging retaining relation with the tire and intermediate flange. The cover is adapted to be applied to the wheel by pressing it axially inwardly into place and is thus self-retaining.

In such a cover, it is desirable to have a central ornamental or identifying medallion disk such as the disk 17 which is shown as made from glass although it is obvious that it can be made from plastic, metal or other material.

Assembly of the disk 17 with the crown 10 of the cover is accomplished by providing the crown with a central opening defined by an axially inwardly extending annular flange 18 which is formed of grooved cross-section to define a radially inwardly opening groove 19 receptive of the margin of the disk 17. At the axially outer side of the groove 19, substantially at juncture of the flange 18 with the crown 10 of the wheel cover member a radially inwardly projecting annular shoulder 20 is provided against which the margin of the disk 17 is received to retain the disk against axially outward displacement. The inner side of the groove 19 is defined by a generally radially inturned extremity flange portion 21, which is radially outwardly offset from the radially inward projecting portion of the shoulder 20, that is, it is on a larger diameter than the smallest diameter of the shoulder 20, so that the edge of the disk 17 can clear the same for assembly purposes, the disk being of smaller diameter than the extremity flange portion 21 but of larger diameter than the shoulder 20.

For retaining the disk 17 within the groove 19, a split retaining ring 22 is provided which is preformed to a larger diameter than the groove 19 but is so proportioned that by contracting the same it will fit within the groove 19 and spring into interlock relation behind the margin of the disk 17 and forwardly of the terminal flange portion 21 which retains the ring in the retaining assembly, the internal diameter of the ring when contracted into the groove 19 being smaller than the diameter of the disk 17 so that the ring blocks inward displacement of the disk and thus holds it in the assembly. In order to facilitate contraction of the ring both for assembly and also to contract the same for removal to release the disk 17, one end portion of the ring is deflected inwardly to provide an engagement extremity 23.

In order to assure that the retaining ring 22 will seat with a high degree of accuracy within the groove 19 and thus firmly and uniformly retain the disk 17, the preformed fully expanded condition of the ring finds it with opposite end sections 24 and 25 comprising approximately the respective end thirds of the ring of radius conforming to the annular radius of the groove 19, while the central intermediate section of the ring, identified at 26, is formed on a greater radius. The radius of the intermediate section 26 is so calculated that when the end sections 24 and 25 of the ring are resiliently deflected toward one another, the intermediate section 26 is contracted until it assumes the same radius as the end sections 24 and 25 to become concentric therewith and concentric with the annular diameter of the groove 19. Hence, when the retaining ring 22 is assembled, it is overcontracted sufficiently to pass the terminal retaining flange portion 21 and then released and will snap into the groove 19, engaging the wall of the groove quite uniformly throughout the extent of the ring under the resilient expanding bias inherent in the retaining ring.

In order that the disk 17 may be substantially thicker than can be accommodated within the groove 19, together with the expansible retaining ring 22 while maintaining the groove 19 to minimum cross-sectional proportions, the disk 17 has a generally rabbet groove 27 at the outer side of its margin receptive of the groove shoulder 20.

A wedging rattle-proof retaining relationship between the margin of the disk 17 and the retaining ring 22 is perfected by having the inner corner portion of the disk margin of shouldered formation as shown at 28 which may be rounded and against which the retaining ring 22 engages in centering wedging retaining relation to press the disk margin against the shoulder 20.

By having the body of the wheel cover 5 made from sheet metal, there is a certain amount of inherent resilience in the medallion supporting flange 18 and which resilience is relied upon, especially in the inner retaining terminal flange portion 21 of the flange in cooperation with the retaining ring 22 to assist the ring in maintaining a firm non-shifting, rattle-free, relatively tight assembled relation of the disk 17 with the cover crown portion 10.

I claim as my invention:

1. In combination in a vehicle wheel cover, a cover member of sheet material having a central opening defined by an inwardly extending annular flange pressed in from material displaced from the opening, said flange being of grooved cross-section defining a generally radially inwardly opening groove having a return bent generally radially outwardly extending portion at juncture with the body providing a radially inwardly projecting shoulder formation affording an axially inwardly facing retaining shoulder adjacent juncture of the flange with the body of the cover member, said flange having a radially inturned inner terminal retaining flange portion of larger diameter than said shoulder and facing generally axially outwardly toward said retaining shoulder, a disk having an outwardly opening marginal groove interfitting with said retaining shoulder, and with the inner side of the disk margin spaced from said terminal flange portion, and a retaining ring member seated within said groove behind said disk margin and forwardly of said terminal flange portion.

2. In combination in a vehicle wheel cover, a cover member having means for engagement with the outer side of a vehicle wheel, said member having a central opening defined by an inwardly extending flange, said flange having a generally axially inwardly facing shoulder and a retaining flange portion extending generally radially inwardly and disposed in axially inwardly spaced relation to said shoulder, a medallion disk seated against said shoulder and having a generally axially inwardly and radially outwardly facing shoulder at its margin opposing said retaining flange portion, and a member wedged between said disk shoulder and said flange portion to retain the disk in engagement with said flange shoulder and substantially centered in the opening.

3. In a sheet metal member having an outer face and an inner face, said member having a central opening defined by an inwardly extending flange pressed in from material displaced from the opening, said flange being of grooved cross-section defining a generally radially inwardly opening groove having a returned bent generally radially outwardly extending portion at juncture with the body providing a generally radially inwardly projecting shoulder formation affording a generally axially inwardly facing retaining shoulder adjacent juncture of the flange with the body of the member, said flange having a radially inturned inner terminal retaining flange portion facing generally axially outwardly toward said shoulder, a disk having an outwardly opening marginal groove interfitting with said retaining shoulder and with the inner side of the disk margin spaced from said terminal flange portion, and a retaining member seated within said groove behind said disk margin and cooperating with said terminal flange portion to retain the disk in place in said opening.

References Cited in the file of this patent

UNITED STATES PATENTS

| Number | Name | Date |
|---|---|---|
| 103,807 | Williams et al. | May 31, 1870 |
| 609,186 | Grubb | Aug. 16, 1898 |
| 1,273,084 | Momb | July 16, 1918 |
| 1,285,071 | Douglas | Nov. 19, 1918 |
| 1,637,247 | Snyder | July 26, 1927 |
| 1,884,238 | Reutter | Oct. 25, 1932 |
| 1,909,853 | Dalton | May 16, 1933 |
| 1,948,676 | Riek | Feb. 27, 1934 |
| 2,051,704 | Harris | Aug. 18, 1936 |
| 2,286,085 | Haggart | June 9, 1942 |
| 2,298,669 | Wood | Oct. 13, 1942 |

FOREIGN PATENTS

| Number | Country | Date |
|---|---|---|
| 773,913 | France | Nov. 28, 1934 |